(12) United States Patent
Nordbruch

(10) Patent No.: US 10,577,818 B2
(45) Date of Patent: Mar. 3, 2020

(54) SECURING A VEHICLE

(71) Applicant: Robert Bosch GmbH, Stuttgart (DE)

(72) Inventor: Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 16 days.

(21) Appl. No.: 15/760,132

(22) PCT Filed: Aug. 23, 2016

(86) PCT No.: PCT/EP2016/069848
§ 371 (c)(1),
(2) Date: Mar. 14, 2018

(87) PCT Pub. No.: WO2017/045868
PCT Pub. Date: Mar. 23, 2017

(65) Prior Publication Data
US 2018/0251994 A1 Sep. 6, 2018

(30) Foreign Application Priority Data

Sep. 18, 2015 (DE) .................... 10 2015 217 923

(51) Int. Cl.
*E04H 6/42* (2006.01)
*B60R 25/10* (2013.01)
(Continued)

(52) U.S. Cl.
CPC ......... *E04H 6/422* (2013.01); *B60R 25/1012* (2013.01); *B62D 15/0285* (2013.01);
(Continued)

(58) Field of Classification Search
CPC .... B60R 25/1012; E04H 6/422; G08G 1/149; G08B 13/19647; E05F 15/70; E05Y 2900/40; B62D 15/0285
(Continued)

(56) References Cited

U.S. PATENT DOCUMENTS 5,049,867 A * 9/1991 Stouffer .............. B60R 25/1003
307/10.2
5,635,899 A * 6/1997 Carlo .................. B60R 25/0225
180/287
(Continued)

FOREIGN PATENT DOCUMENTS

CN 104032994 A 9/2014
DE 102012222562 A1 6/2014
(Continued)

OTHER PUBLICATIONS

International Search Report dated Dec. 8, 2016, of the corresponding International Application PCT/EP2016/069848 filed Aug. 23, 2016.

*Primary Examiner* — Atul Trivedi
(74) *Attorney, Agent, or Firm* — Norton Rose Fulbright US LLP; Gerard Messina

(57) ABSTRACT

A parking system includes a parking lot having a parking space for parking a motor vehicle; sensors for scanning the parking lot; and a processing unit for assisting in a parking or pickup operation of the motor vehicle independently of a driver, the processing unit being designed to determine that a motor vehicle which is detected inside the parking lot with the aid of the sensors is driving outside a parking or pickup operation controlled independently of a driver, and to trigger an action in response.

9 Claims, 2 Drawing Sheets

(51) Int. Cl.
*G08G 1/14* (2006.01)
*B62D 15/02* (2006.01)
*E05F 15/70* (2015.01)
*G08B 13/196* (2006.01)

(52) U.S. Cl.
CPC ............ *E05F 15/70* (2015.01); *G08G 1/149* (2013.01); *E05Y 2900/40* (2013.01); *G08B 13/19647* (2013.01)

(58) Field of Classification Search
USPC .......................................................... 49/31
See application file for complete search history.

(56) References Cited

U.S. PATENT DOCUMENTS

| | | | | |
|---|---|---|---|---|
| 6,340,935 | B1 | 1/2002 | Hall | |
| 7,944,368 | B2* | 5/2011 | Carter | B60T 7/16 |
| | | | | 340/426.11 |
| 9,117,318 | B2* | 8/2015 | Ricci | B60W 50/085 |
| 10,140,793 | B2* | 11/2018 | Nordbruch | G08G 1/005 |
| 2008/0108370 | A1* | 5/2008 | Aninye | B60R 25/1004 |
| | | | | 455/456.1 |
| 2009/0240400 | A1* | 9/2009 | Lachapelle | B60R 25/04 |
| | | | | 701/45 |
| 2010/0156672 | A1 | 6/2010 | Yoo et al. | |
| 2011/0131083 | A1* | 6/2011 | Redmann | B60L 11/1848 |
| | | | | 705/13 |
| 2012/0188100 | A1 | 7/2012 | Min et al. | |
| 2013/0113936 | A1* | 5/2013 | Cohen | G07B 15/02 |
| | | | | 348/148 |
| 2013/0117078 | A1* | 5/2013 | Weik, III | G06Q 10/00 |
| | | | | 705/13 |
| 2013/0279757 | A1* | 10/2013 | Kephart | G06K 9/00771 |
| | | | | 382/105 |
| 2014/0214500 | A1* | 7/2014 | Hudson | G06Q 30/0284 |
| | | | | 705/13 |
| 2014/0306814 | A1* | 10/2014 | Ricci | G01C 21/3484 |
| | | | | 340/425.5 |
| 2015/0005986 | A1* | 1/2015 | Kantajaraniti | B60R 25/066 |
| | | | | 701/2 |
| 2015/0138001 | A1* | 5/2015 | Davies | G08G 1/149 |
| | | | | 340/932.2 |
| 2015/0211281 | A1* | 7/2015 | Krupke | E05F 15/60 |
| | | | | 49/506 |
| 2015/0345965 | A1* | 12/2015 | Semsey | G07B 15/02 |
| | | | | 701/537 |
| 2016/0267794 | A1* | 9/2016 | Cogill | G08G 1/143 |
| 2017/0262793 | A1* | 9/2017 | Pacque | G06K 7/10861 |
| 2017/0323227 | A1* | 11/2017 | Sadeghi | G07F 17/246 |
| 2017/0330399 | A1* | 11/2017 | Nordbruch | G08G 1/005 |
| 2019/0088119 | A1* | 3/2019 | O'Callaghan | G08G 1/0129 |

FOREIGN PATENT DOCUMENTS

| | | |
|---|---|---|
| DE | 102013222071 A1 | 4/2015 |
| DE | 102014224079 A1 | 6/2016 |
| EP | 1361555 A2 | 11/2003 |
| EP | 2700546 A1 | 2/2014 |
| FR | 2648595 A1 | 12/1990 |
| JP | S621662 U | 1/1987 |
| JP | 2003016487 A | 1/2003 |
| JP | 2004118342 A | 4/2004 |
| JP | 2007219738 A | 8/2007 |
| JP | 2012003393 A | 1/2012 |
| JP | 2018501544 A | 1/2018 |
| JP | 2018502000 A | 1/2018 |
| JP | 2018502357 A | 1/2018 |
| JP | 2018503893 A | 2/2018 |
| JP | 2018508082 A | 3/2018 |
| JP | 2018515841 A | 6/2018 |
| JP | 2018519565 A | 7/2018 |
| KR | 100459533 B1 | 11/2004 |

\* cited by examiner

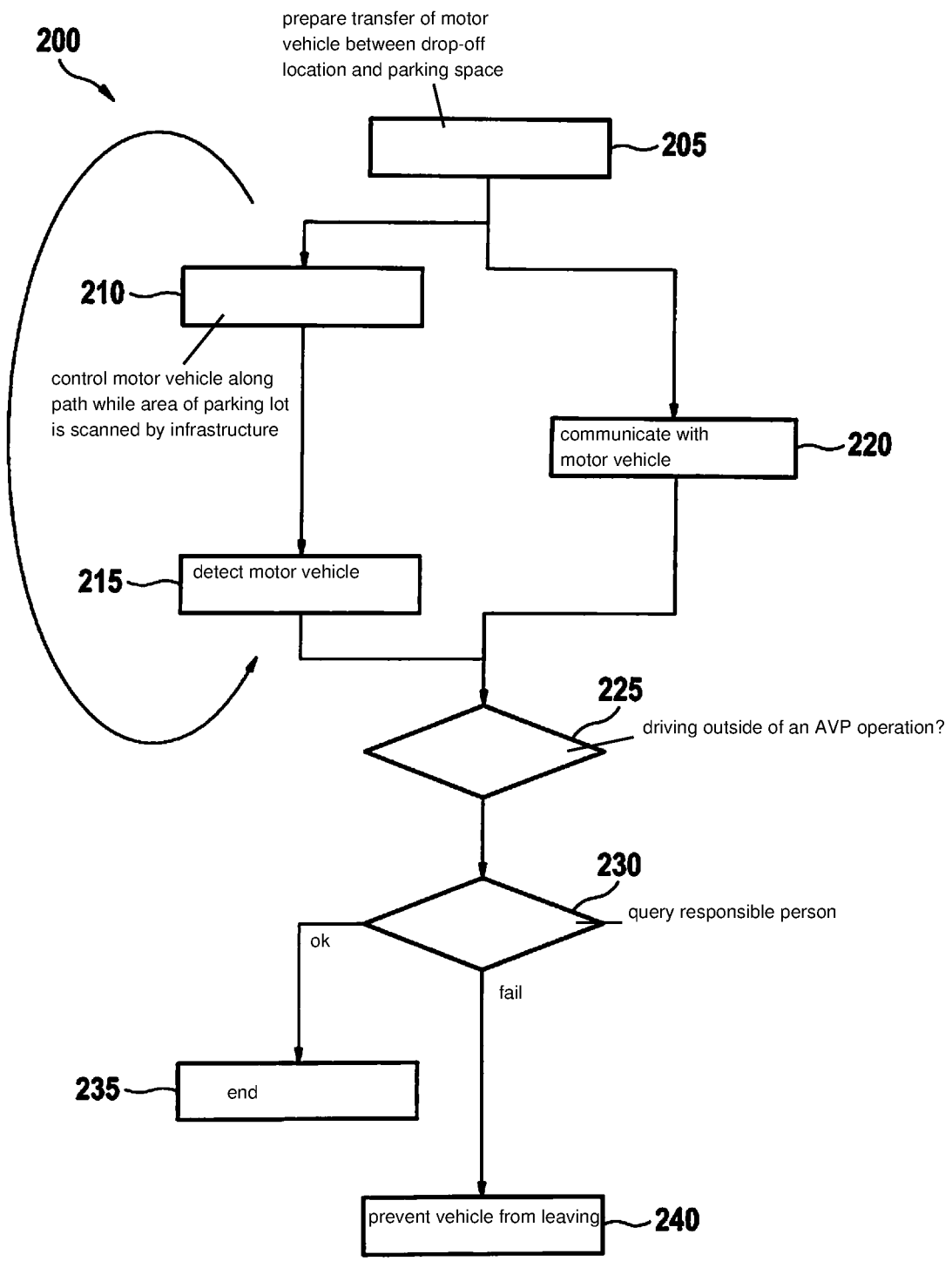

SECURING A VEHICLE

FIELD

The present invention relates to securing a motor vehicle. In particular, the present invention relates to securing a motor vehicle in a parking lot.

BACKGROUND INFORMATION

A parking lot having a plurality of parking spaces is designed to assist in AVP operations (automated valet parking). Here, the driver can take the motor vehicle to a drop-off location and leave it there. The motor vehicle will then be steered to one of the parking spaces and parked there in an automated manner and without any driver intervention. If the driver wishes to use the motor vehicle again, the motor vehicle can be steered from the parking space to the drop-off location, in a likewise automated manner, where the driver takes possession of the vehicle.

If the motor vehicle is stolen from the parking space, the loss of the motor vehicle may be noticed only relatively late, usually when the owner attempts to access the motor vehicle. It is an object of the present invention to provide improved technology for securing a motor vehicle in an AVP parking lot.

SUMMARY

In accordance with an example embodiment of the present invention, a method for securing a motor vehicle against an unauthorized removal from an AVP parking lot includes steps of scanning the parking lot with the aid of sensors, of determining that the motor vehicle is moving in the area of the parking lot, of determining that the motor vehicle is driving outside a parking or pickup operation controlled independently of a driver, and of triggering an action.

The parking lot equipped for assisting an AVP operation is designed to monitor the control of the motor vehicle in the area of the parking lot without the presence of a driver. This is a usual requirement for improving the automated guidance of the motor vehicle in the area of the parking lot within the scope of the parking or pickup operation independently of a driver. For example, the risk of a collision with another motor vehicle or with an object in the parking lot that may be noticed only very late or not at all is able to be reduced in this way. Utilizing the already installed infrastructure of the AVP parking lot makes it possible to prevent an unauthorized removal in an uncomplicated and reliable manner. The removal of the motor vehicle is able to be noticed very quickly so that the initiated action is able to be effective.

The action may include the detection of a confirmation by a person who is in charge of the motor vehicle or the parking lot. In other words, prior to executing the action, an inquiry may be made to a competent person. If the person confirms that the motor vehicle is allowed to leave, then the action is able to be suppressed. On the other hand, if the person confirms that the removal should be prevented or if the consent for the removal is not received within a predefined period of time, e.g., 10 to 30 seconds, then the action may be triggered and executed. This makes it easier to avoid a false alarm. Nevertheless, the person in charge is able to be notified of the removal attempt of the motor vehicle without a delay.

Generally, at least two different types of actions may be triggered, which are also combinable with each other. The first type of action relates to preventing the complete removal of the motor vehicle, while the second type of action relates to documenting the removal process.

In one specific embodiment, the action includes the erection of a physical barrier against a departure of the motor vehicle from the parking lot. Such a barrier, for example, may be a sliding door, a rolling shutter gate, or a barricade that can be raised from the ground, or a barrier. The motor vehicle will then be forced to remain in the area of the parking lot until it is established beyond a doubt whether or not the removal of the motor vehicle from the area of the parking lot is permitted.

In another specific embodiment, the action includes the output of a message. The message may be output in particular to an owner or a driver of the motor vehicle, to an official authority such as the police, a guard service or to a service staff of the parking lot. This makes it possible to quickly prompt a responsible person to act, and possibly to intervene in time in order to check the unauthorized removal operation.

Preferably, additional information is acquired in the area of the parking lot and recorded over a predefined past time period. The aforementioned message may include the additional information. This additional information may particularly include camera or video images from the area of the parking lot. In addition, further information that was collected within the framework of a parking operation of the motor vehicle, may be compiled and/or stored. This information, for example, may include a number plate of the motor vehicle, an arrival time, a removal time, in the form of a date and time in each case, or other information. The information may also be processed or preprocessed in that a person steering the motor vehicle is shown in enlarged form or in extracted form on the basis of the camera or video image, for instance.

A computer program product includes program code for executing the described method when the computer program product is running on a processing unit or is stored on a computer-readable data carrier.

A parking system includes a parking lot having at least one parking space for parking a motor vehicle, sensors for scanning the parking lot, and a processing unit for assisting in a parking or pickup operation of the motor vehicle carried out independently of a driver. The processing unit is designed to determine that a motor vehicle detected in the parking lot with the aid of the sensors is driving outside of a parking or pickup operation independently of a driver, and to trigger an action in response.

The processing unit is preferably designed to carry out the afore-described method. For this purpose, the processing unit may include a programmable microcomputer on which said computer program product is running.

The present invention is described below in greater detail with reference to the figures.

BRIEF DESCRIPTION OF THE DRAWINGS

FIG. 2 shows a flow diagram of a method for securing the motor vehicle in the parking lot from FIG. 1.

DETAILED DESCRIPTION OF EXAMPLE EMBODIMENTS

Figure 1:
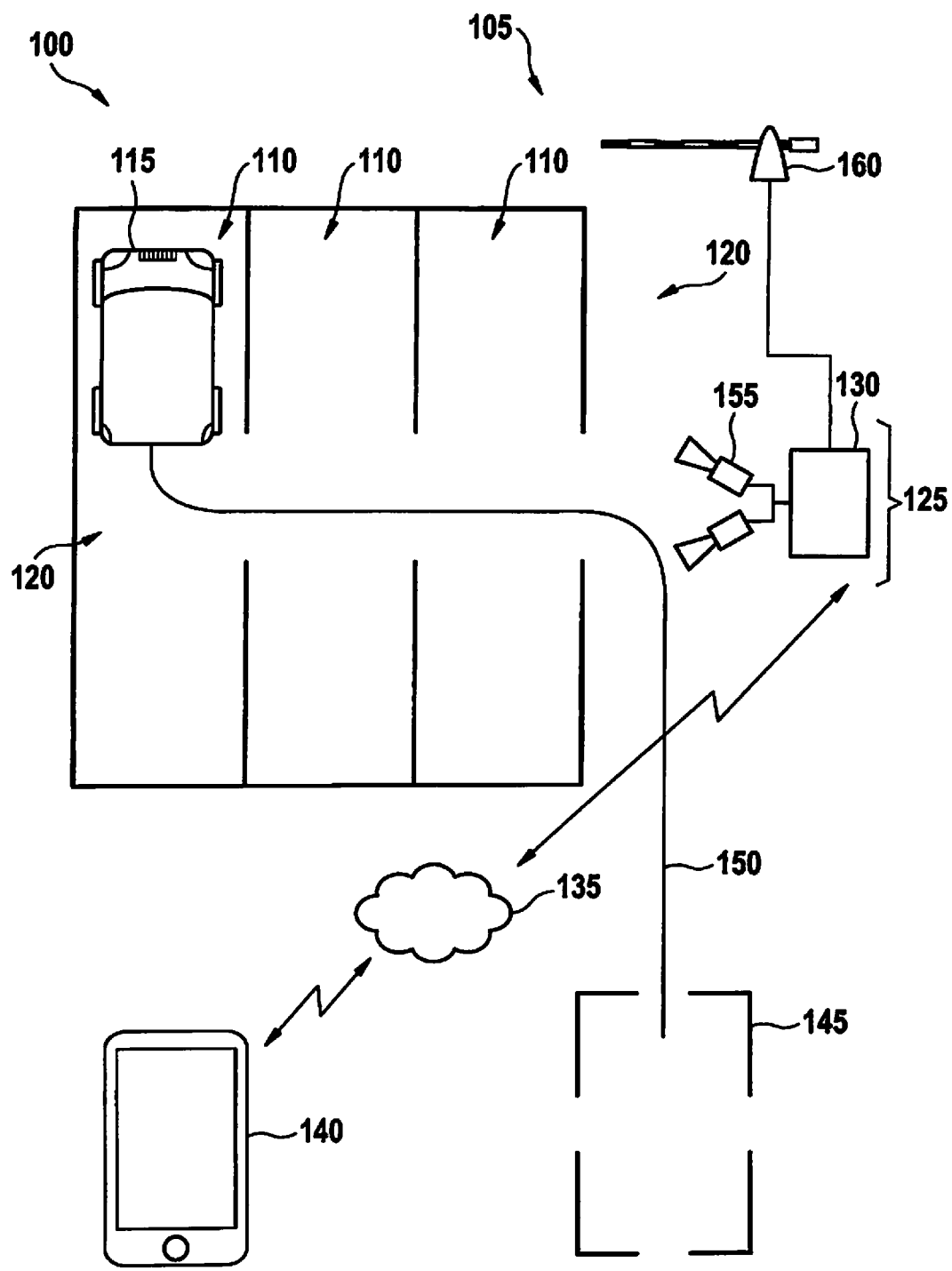
FIG. 1 shows a system with an AVP parking lot and a motor vehicle.

FIG. 1 shows a system 100 with a parking lot 105. Parking lot 105 may be located in the open or in a parking garage and includes a number of parking spaces 110 for parking a motor vehicle 115; it normally also includes one or more traffic areas 120 via which parking spaces 110 are able to be accessed.

It is generally the case that an operating device 125 having a processing unit 130 is provided in order to organize or control the parking or pickup of motor vehicles 115 inside parking lot 105. For instance, a reservation or payment operation for a parking process may be carried out with the aid of operating device 125. Preferably, processing unit 130 is connected to a network 135 in order to be able to carry out a reservation or payment operation with the aid of a remote device 140, for example. Network 135 may be partly developed as a wireless network. In particular, a part of the Internet or a mobile network may be utilized for network 135. Device 140, for instance, may include a computer or a mobile device, especially a so-called smartphone or a tablet computer.

Parking lot 105 is designed to assist in what is referred to as an AVP operation (automated valet parking). For this purpose, a drop-off location 145 is provided where a motor vehicle 115 is able to be parked or received. The movement of motor vehicle 115 between drop-off location 145 and a parking space 110 along a route 150 may be controlled independently of a driver. Operating device 125 usually includes a number of sensors 155 for scanning parking lot 105 to do so, in particular for scanning traffic areas 120 or parking spaces 110.

In different specific embodiments, the control of motor vehicle 115 is predominantly handled by processing unit 130, mainly by a processing unit on board motor vehicle 115, or in cooperation between the two processing units. Information may be exchanged between motor vehicle 115 and operating device 125 in the process, usually with the aid of a local wireless network or via network 135. Sensors 155 may particularly include a camera, a video camera, a radar sensor, a lidar sensor, a light barrier, a capacitive or an inductive proximity sensor, an inductive loop, an ultrasonic sensor, or basically any other sensor that is able to assist in a control of motor vehicle 115 in the area of parking lot 105 and, in particular, to sense an area around motor vehicle 115.

Operating device 125 is designed to monitor parking lot 105 and in particular to detect motor vehicles 115 that are moving in the area of parking lot 105. It is proposed that this functionality be used for securing a motor vehicle 115 against an unauthorized removal from parking lot 105 or from parking space 110. For example, in the event that a person makes an attempt to steal a motor vehicle 115 parked in a parking space 110, this person has to move it through an area of parking lot 105 that is monitored by sensors 155 in order to leave the area of parking lot 105. Operating device 125 may detect motor vehicle 115 during this attempt and trigger an action possibly aimed at documenting the removal operation or at preventing the complete removal of motor vehicle 115 from the area of parking lot 105. In the latter case, a physical barrier 160, in particular, may be activated in the area of parking lot 105.

Barrier 160 may be a barricade, a gate or some other mobile obstacle.

FIG. 2 shows a flow diagram of a method 200 for securing motor vehicle 115 in parking lot 105 from FIG. 1.

In a conventional AVP sequence, a transfer of a motor vehicle 115 between the drop-off location 145 and a parking space 110 is usually prepared in a step 205. Motor vehicle 115 is then controlled along path 150, while an area of parking lot 105 is scanned by the infrastructure of parking lot 105, in particular by operating device 125, in a step 210 and motor vehicle 115 is detected in a subsequent step 215.

Information that was scanned in step 210 may additionally be stored. In particular, information within a predefined past time window is able to be stored for later use.

Parallel to steps 210 and 215, a communication 220 with motor vehicle 115 usually takes place in order to improve the control along path 150. Steps 210 through 220 normally run in a recurrent manner in the form of a loop; steps 210 and 215, for one, and step 220, for another, are able to be carried out in a synchronized or concurrent manner.

Steps 205 through 220 are usually included in an AVP operation but may at least partially be used for securing a motor vehicle 115 against an unauthorized removal from the area of parking lot 105. In particular, findings obtained in steps 210 and 215 may be utilized in order to determine a motor vehicle 115 that is moving in the area of parking lot 105 outside an AVP operation. Since operating device 125 usually assists in the control of motor vehicle 115 along path 150 within the scope of an AVP operation, it is easily decided in a step 225 whether a motor vehicle 115 that is moving in the area of parking lot 105 is driving outside of an AVP operation. Normally linked with step 225 is a control of motor vehicle 115 in parking lot 110 independently of a driver. This function is not shown in greater detail in FIG. 2.

If it was determined that motor vehicle 115 is moving in parking lot 110 outside an AVP operation, then it is optionally possible to make an inquiry to a competent or responsible person in a step 230. If this inquiry has a positive result, i.e., the person thus confirms that motor vehicle 115 may be removed from the area of parking lot 105, then method 200 may come to an end in a step 235. For example, a driver who picks up his motor vehicle from parking lot 110 earlier than expected may identify himself as authorized so that no action will be triggered. In the opposite case, or if a consent of the responsible person fails to arrive within a predetermined time period in step 230, then one or more action(s) may be set in motion in a step 240. These actions may have the goal of physically preventing the effective removal of motor vehicle 115 from the area of parking lot 105, of documenting the removal operation, or of outputting a reference to a person in charge. During the documentation or in the reference, the information stored in step 210 may be accessed, in particular.

What is claimed is:

1. A method for securing a motor vehicle against an unauthorized removal from an AVP parking lot, the method comprising:
   scanning the parking lot with the aid of sensors;
   determining that the motor vehicle is moving in an area of the parking lot;
   determining that the motor vehicle is driving outside a parking or pickup operation controlled independently of a driver by a person not in charge of the motor vehicle or of the parking lot; and
   triggering an action.

2. The method as recited in claim 1, wherein the parking lot is designed to assist in a guidance of the motor vehicle independently of a driver between a drop-off location and a parking space within the framework of the parking or pickup operation independently of a driver.

3. The method as recited in claim 1, wherein the action includes detecting a confirmation of a person in charge of the motor vehicle or of the parking lot.

4. The method as recited in claim 1, wherein the action includes an erection of a physical barrier against the departure of the motor vehicle from the parking lot.

5. The method as recited in claim 1, wherein the action includes an output of a message.

6. The method as recited in claim 5, wherein additional information is acquired in the area of the parking lot and recorded over a predefined past time period, and the message includes the additional information.

7. The method as recited in claim 6, wherein the information includes a camera image, an image sequence, a date and time, and reservation information for use of the parking space.

8. A non-transitory computer-readable data carrier on which is stored a computer program having program code for securing a motor vehicle against an unauthorized removal from an AVP parking lot, the computer program, when executed by a processor, causing the processor to perform:
scanning the parking lot with the aid of sensors;
determining that the motor vehicle is moving in an area of the parking lot;
determining that the motor vehicle is driving outside a parking or pickup operation controlled independently of a driver by a person not in charge of the motor vehicle or of the parking lot; and
triggering an action.

9. A parking system, comprising:
a parking lot having at least one parking space for parking a motor vehicle;
sensors for scanning the parking lot; and
a processing unit for assisting in a parking or pickup operation of the motor vehicle independently of a driver, the processing unit being designed to determine that a motor vehicle which is detected in the parking lot with the aid of the sensors is driving outside a parking or pickup operation controlled independently of a driver by a person not in charge of the motor vehicle or of the parking lot, and to trigger an action in response to the detection.

* * * * *